United States Patent [19]
Chen

[11] Patent Number: 5,648,895
[45] Date of Patent: Jul. 15, 1997

[54] FLYBACK AND CHARGING CIRCUITRY FOR AN UNINTERRUPTIBLE POWER SUPPLY SYSTEM

[75] Inventor: Gordon Chen, Hsin Tien, Taiwan

[73] Assignee: Sysgration Ltd., Taipei Hsieng, Taiwan

[21] Appl. No.: 574,893

[22] Filed: Dec. 19, 1995

[51] Int. Cl.[6] .................................................. H02M 3/335
[52] U.S. Cl. .................................................. 363/131
[58] Field of Search .............................. 363/21, 23, 25, 363/222, 282, 255, 267, 97, 131, 84, 127

[56] References Cited

U.S. PATENT DOCUMENTS

| | | | |
|---|---|---|---|
| 5,465,201 | 11/1995 | Cohen | 363/31 |
| 5,515,257 | 5/1996 | Ishii | 363/21 |
| 5,528,482 | 6/1996 | Rozman | 363/21 |
| 5,541,828 | 7/1996 | Rozman | 363/21 |

*Primary Examiner*—Aditya Krishnan
*Attorney, Agent, or Firm*—Bacon & Thomas

[57] ABSTRACT

The present invention relates to an improving circuit of uninterruptible power system which especially improve the flyback circuit and charging circuit. In the active flyback circuit of the present invention, the flyback coil is changed from the traditional drive terminal to the feed-back terminal in order to eliminate the remaining electromotive force in the transformer and reduce the heat energy loss in flyback cycle because the flyback voltage only require one battery voltage (1BT+) for driving, so it is called active flyback circuit; moreover, the present invention use the internal current limit circuit of switching power regulator as the protection of basic charging; then, the CPU will output fix frequency to the battery charge to have switching transistor to switch ON and OFF during charge of battery and provide intermittent charge to battery in order to prevent the floating effectiveness of battery voltage and to have efficient charging to battery to reduce the charging time that is intelligent fast charging circuit.

4 Claims, 4 Drawing Sheets

5,648,895

FLYBACK AND CHARGING CIRCUITRY FOR AN UNINTERRUPTIBLE POWER SUPPLY SYSTEM

BACKGROUND OF THE INVENTION

1. Field of the Invention

The present invention relates to an improved uninterruptible power supply circuit which uses an active flyback circuit to eliminate the remaining electromotive force in the transformer, to reduce heat loss during a flyback cycle, and to increase the safety of the uninterruptible power system; and also to an uninterruptible power supply circuit which uses an intelligent fast-charging circuit to achieve higher efficiency charging and to reduce the charging time.

2. Description of Related Art

At present, uninterruptible power systems (abbreviated as UPS) are very popular because many machines do not tolerate sudden power interruptions. For example, if power to a computer terminal is suddenly interrupted, important data may be lost. As a result, many kinds of UPS have been developed for the market. The present invention is an improvement over the conventional UPS. The technical contents of the present invention are different from that of co-pending application U.S. 08/327,935, filed on May 4, 1994.

One of the disadvantages of the conventional UPS has to do with the increasing use of microprocessors and digital circuitry, which are subject to problems of electromagnetic interference (abbreviated as EMI), electromagnetic susceptibility (abbreviated as EMS), and electromagnetic compatibility (abbreviated as EMC), and which are not adequately addressed by the conventional UPS.

As shown in FIG. 1, the conventional UPS adds capacitor C1, capacitor C2, and capacitor C3 to the input filter circuit of the power supply in order to reduce interference from electrical induction, but adding capacitor C1, capacitor C2, and capacitor C3 creates a capacitive reactance (Xc=½πfc) in the circuit, and the output value of the voltage is reduced. Thus, it is necessary to enlarge the capacitor C1, capacitor C2, and capacitor C3 in the conventional UPS in order to reduce the capacitive reactance in the circuit, but enlargement of the capacitor in the input filter circuit not only increases the load on the UPS flyback circuit, it also usually causes damage to the UPS.

On the other hand, the charging circuit of the conventional UPS uses a constant voltage (13.7 V) and a constant current (0.5 A) to provide continuous but slow charging, requiring ten hours to fully charge. This is disadvantageous because when continuous charge is supplied to the battery, the voltage will fluctuate since the voltage at the charging terminal will be higher than the voltage of the uncharged terminal, reducing the charging current and further prolonging charging time. As a result, the charging time of the UPS battery is excessive, causing the battery to be overcharged and reducing the working life of the battery.

SUMMARY OF THE INVENTION

FIG. 2 is a waveform diagram of a pulse-width modulator (abbreviated PWM). Since a transformer is an inductance with the characteristic of effective energy storage, in a pulse-width control circuit, the transformer needs to release energy in advance during the alternating switch of voltage polarity (T2 of FIG. 2) in order to prevent the transformer from generating a counterelectromotive force. This energy release is called back up and is in general achieved by shorting the coil of the transformer to eliminate the counterelectromotive force that is created by the alternating switch of voltage polarity.

In the active flyback circuit of the present invention, the flyback coil is charged from the traditional drive terminal to a feed-back terminal, and is connected through a bridge rectifier to provide full-wave rectification, at which time the flyback driving voltage only needs to be driven by a single battery voltage (1BT+) with the flyback MOSFET following the rule that when the flyback cycle (/PWM) is 1, it is ON, and when the flyback cycle (/PWM) is 0, it is OFF, thus providing direct driving without any charging in advance.

When the AC bypass changes to the PWM mode, the active flyback circuit of the present invention can perform flyback action during period T1 to eliminate the remaining electromotive force in the transformer, after which the PWM wave will be allowed to output.

The stored energy of the active flyback circuit of the present invention is given by the formula $W=\frac{1}{2}(CV^2)$, and should be eliminated by MOSFET during the flyback cycle of UPS. However, when the resistance of flyback coil is $1.1\Omega$ and the MOSFET is ON, the internal resistance is around 40 m$\Omega$, so that most of the energy is released to the feed-back coil, significantly reducing energy loss in the flyback MOSFET.

The intelligent fast-charging circuit of the invention uses an internal current limit circuit of a potentiostat for basic charging protection; and outputs a fixed frequency from a microprocessor (abbreviated as CPU) to the charging point of the battery to cause the transistor to switch ON and OFF in accordance with battery charging and thereby provide intermittent charging of the battery, thus preventing the floating voltage effect and providing efficient charging of the battery in order to reduce the charging time.

BRIEF DESCRIPTION OF THE DRAWINGS

The invention, as well as its many advantages, may be further understood by the following detailed description and drawings in which.

DETAILED DESCRIPTION OF THE PREFERRED EMBODIMENT

Figure 3:
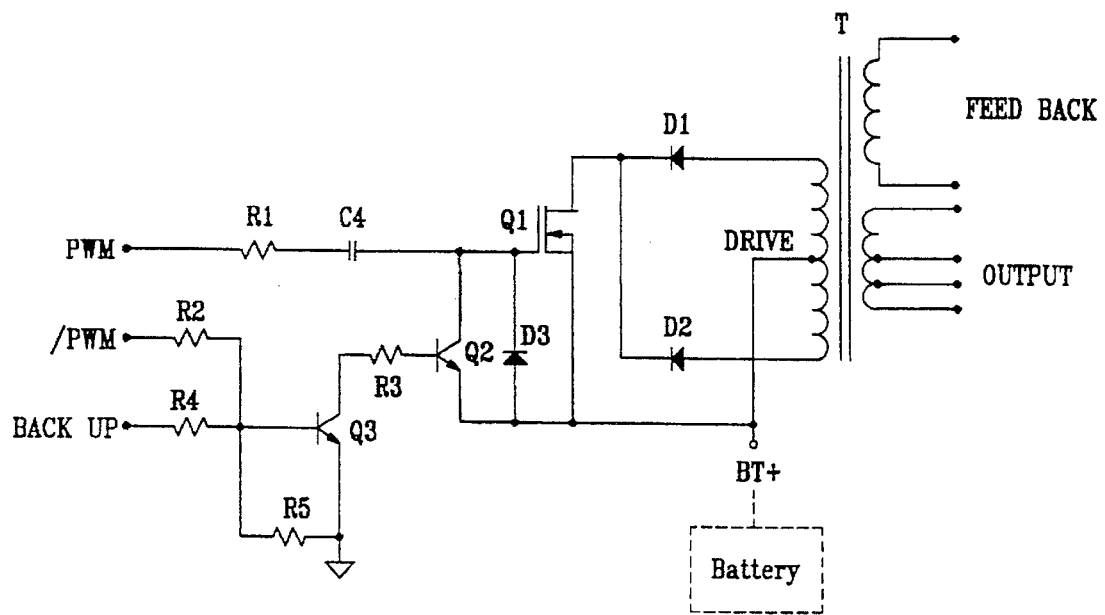
FIG. 3 is a schematic circuit diagram of a conventional passive flyback circuit.

FIG. 3 shows a conventional passive flyback circuit in which, when the PWM is 0 and MOSFET Q1 is OFF, the capacitor C4 starts charging to the battery voltage (BT+), and when PWM is 1, two times the battery voltage (2BT+) is required to switch MOSFET Q1 to ON to perform a flyback action. Because this circuit must be charged in advance in order to perform flyback, it is called a passive flyback circuit. Moreover, since the conventional flyback circuit requires two times the battery voltage (2BT+) in order to change the status of MOSFET Q1 to ON to perform a flyback action, the conventional circuit also requires a longer flyback cycle and cannot eliminate the remaining energy in the transformer in a short time. The present invention addresses these defects.

Figure 4:
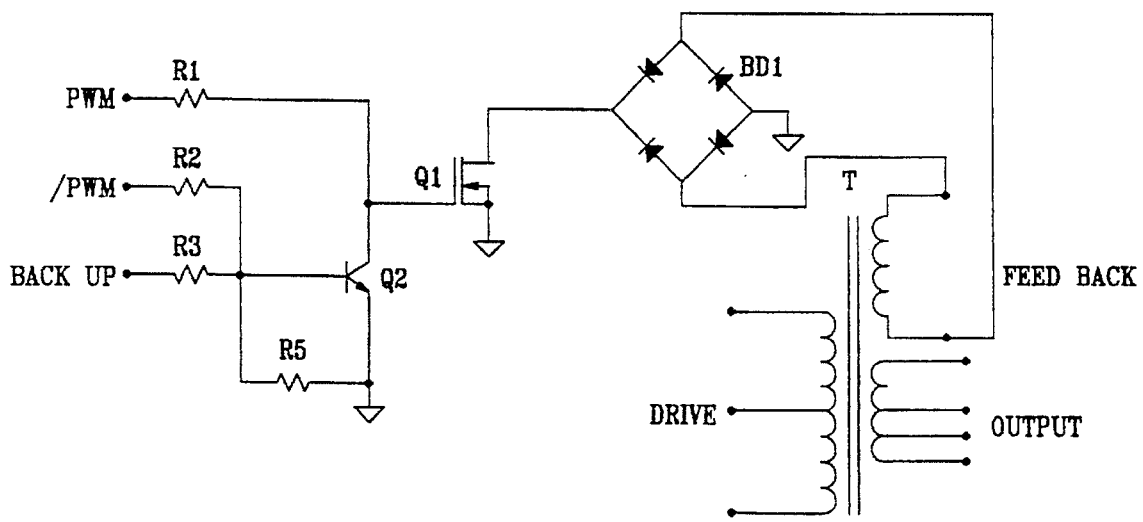
FIG. 4 is a schematic circuit diagram of the active flyback circuit of the present invention.

Referring to FIG. 4, the active flyback circuit of the present invention includes one bridge rectifier BD1, one MOSFET Q1, one transformer, one transistor Q2 and several resistors R1, R2, R3, and R5.

The bridge rectifier BD1 is for full-wave rectification, the MOSFET Q1 is an active component of the flyback cycle, and the transformer is a combination of an energy storage coil and flyback coil, a feed-back terminal, a drive terminal, and an output terminal in which the flyback coil connects to the feed-back terminal instead of the drive terminal in order to eliminate the remaining energy in the transformer, the transistor Q2, and the plurality of resistors.

As show in FIG. 4, the flyback coil of the active flyback circuit of the present invention is therefore connected to the feed-back terminal rather than to the drive terminal as in FIG. 3. The coil resistance of the feed-back terminal is 1.1 Ω, with bridge rectification being provided by bridge rectifier BD. As a result, the flyback voltage only requires one battery voltage (1BT+) for driving, and MOSFET Q1 follows the flyback cycle so that when PWM is 1, Q1 is ON, and when PWM is 0, Q1 is OFF, and thus the MOSFET Q1 can be driven directly without any charging in advance, which is why it is referred to as an active flyback circuit.

Figure 1:
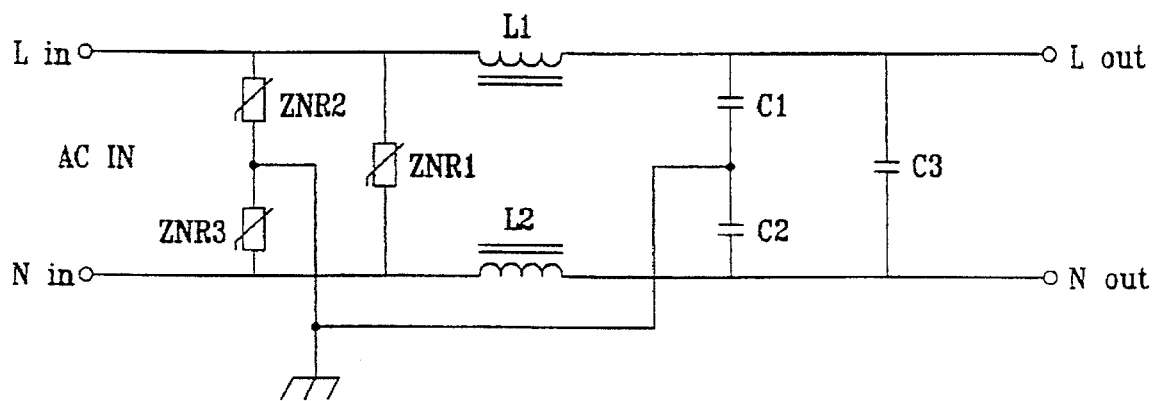
FIG. 1 is a schematic circuit diagram of a line/EMI.
Figure 2:
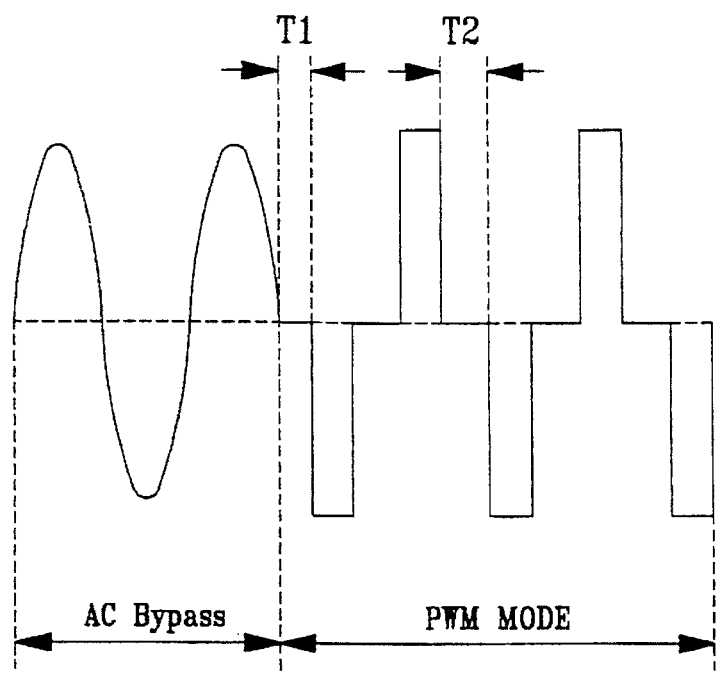
FIG. 2 is a waveform diagram showing pulse-width modulation.

Moreover, the active flyback circuit of the present invention can perform the flyback action in period T1 when the AC bypass of FIG. 2 is in PWM mode to eliminate the remaining electromotive force in the transformer, after which it can output the PWM wave again. When the power input to capacitor C1, capacitor C2 and capacitor C3 is larger (please refer to FIG. 1), the stored energy can be calculated by the formula $W=\frac{1}{2}(CV^2)$. The stored energy needs to be eliminated by MOSFET Q1 in the flyback cycle of the UPS, and since the resistance of flyback coil is 1.1Ω, and the internal resistance of MOSFET Q1 in ON mode is around 40 mΩ, most of the energy will be released in the feed-back coil which greatly reduces the heat loss in MOSFET Q1 during flyback to thereby increase the safety of the UPS.

In FIG. 4, the back up terminal is for protection purposes. When an AC bypass is output, the voltage on the back up terminal becomes high in order to turn Q2 as ON and force Q1 into an OFF mode, preventing the flyback action. No matter what mode terminals PWM and/PWM are in, whenever AC is OFF, no flyback action is performed.

Figure 5:
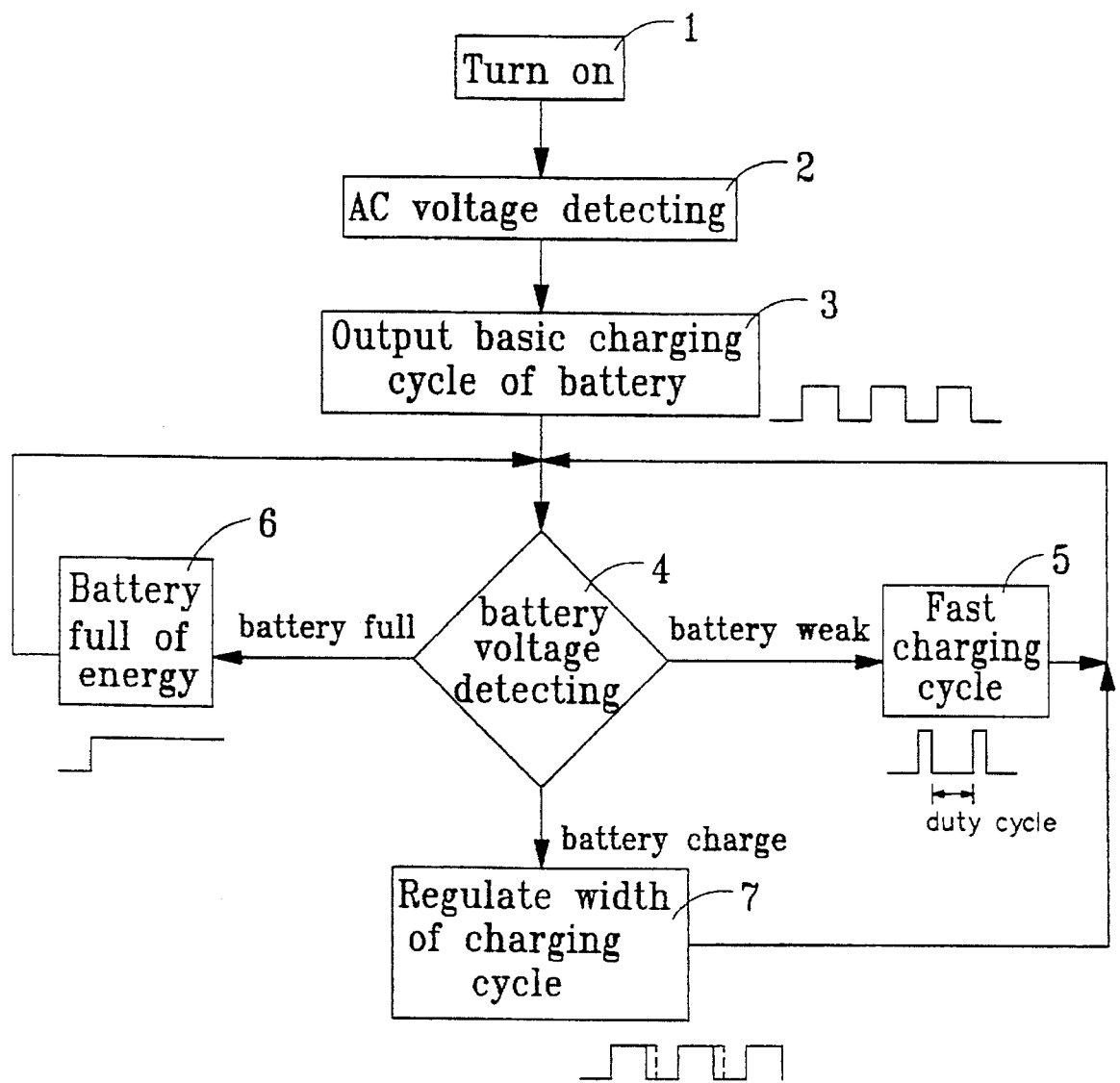
FIG. 5 is a charging flow chart of the present invention.

FIG. 5 is a charging flow chart of the present invention. After the UPS turns on in step 1, the CPU detects the AC voltage at step 2 through an A/D converter and then outputs the battery basic charging cycle (step 3). When the CPU reads the battery voltage (step 4), if the battery is low in power, the CPU adjusts the charging cycle to a fast-charging cycle (step 5); if the battery is at full power, the output of the CPU charging cycle is "1" which represents the battery at full power (step 6), and if the battery is neither full power nor in a fast-charging cycle, the CPU will adjust the width of the charging cycle (step 7) to an appropriate time period in order for the battery to charge continuously.

Figure 6:
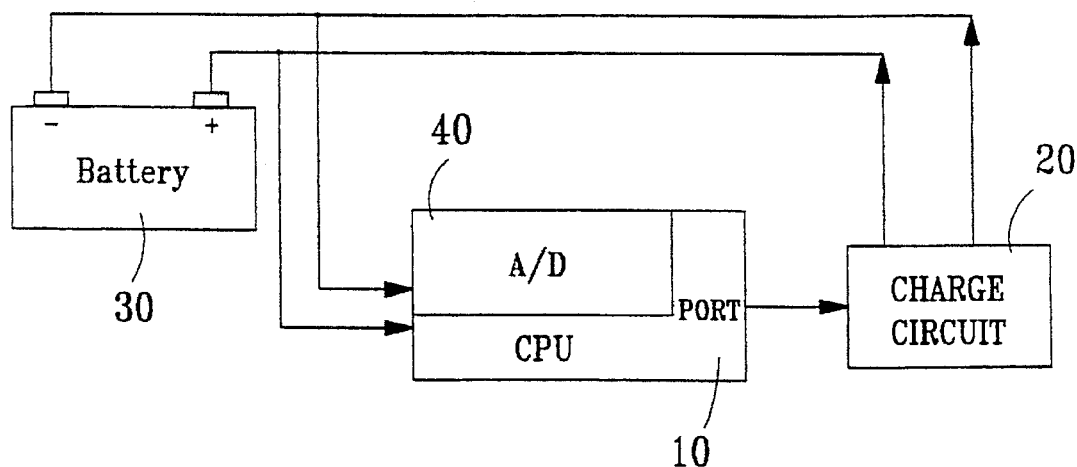
FIG. 6 is a block diagram of the detecting battery circuit of the present invention.

FIG. 6 is a block diagram of the charging battery detection circuit of the present invention. The intelligent fast-charging circuit 20 of the present invention uses an analog/digital converter 40 (abbreviated as A/D converter) to detect the terminal voltage of battery 30 in order to check the current stored energy in battery 30. If the stored energy is small, the charging cycle is enlarged to provide fast charging that can reduce the danger of computer failure when the battery 30 stays too long in a low power status in charging circuit 20. When CPU 10 detects an energy increase in battery 30, it adjusts the width of the charging cycle until the battery is fully charged and the CPU 10 turns off the charging cycle to prevent overcharge to reduce the working life of the battery.

Figure 7:
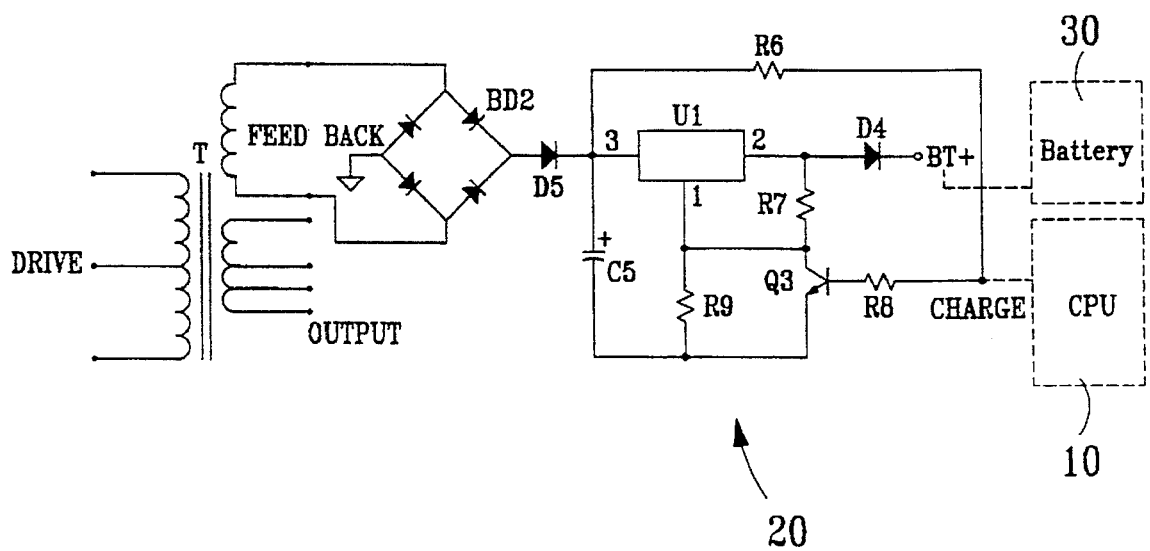
FIG. 7 is a schematic circuit diagram of the intelligent fast-charging circuit of the present invention.

FIG. 7 is a schematic circuit diagram of the intelligent fast-charging circuit of the present invention, which includes a bridge rectifier BD2, a switching power regulator, a transformer, a switching transistor Q3, two rectifying diodes, a capacitor, and several resistors.

The bridge rectifier BD2 is for full-wave rectification, the switching power regulator is an internal current limit circuit for providing charging protection to the battery, the transformer is a combination of coils with energy storage characteristics, and switching transistor Q3 can switch ON and OFF in order to provide intermittent charging of the battery in order to prevent a floating effect for the battery voltage in continuous charging; two rectifying diodes, the capacitor and several resistors.

As shown in FIG. 7, the intelligent fast-charging circuit of the present invention uses the internal current limit circuit 1.5 A of switching power regulator U1 to provide basic charging protection, the CPU 10 outputting a fixed frequency to cause switching transistor Q3 to switch ON and OFF during charging of battery 30 and provide intermittent charging of battery 30 in order to prevent the floating effect of the battery voltage and reduce the charging time.

Moreover, in FIG. 7, the intelligent fast-charging circuit can be used with various types of batteries to set the charging current of hardware at the maximum value as protection and then to use intermittent charging to adjust the duty cycle of the battery-charging curve so as to prevent change in the battery working-life and to increase the charging efficiency and reduce charging time.

The advantages of the present invention as compared to the conventional UPS are as follows:

1. In the flyback cycle of the active flyback circuit of the present invention, MOSFET Q1 is an ON status during the entire flyback cycle, squaring the waveform, whereas, in the conventional flyback circuit, the ON time of the MOSFET Q1 during the flyback cycle depends on a RC time constant.

2. The intelligent fast-charging circuit of the present invention uses a CPU program to control an A/D converter in order to achieve efficient charging which not only increases the efficiency of UPS, but also provides better operating functions for users.

Many changes and modifications in the above-described embodiment of the invention can, of course, be carried out without departing from the scope thereof. Accordingly, to promote the progress in science and the useful arts, the invention is disclosed in detail but is intended to be limited only by the scope of the appended claims.

What is claimed is:

1. An active flyback circuit for an uninterruptible power system, which comprises:

a DC power source;

a flyback transformer having a drive coil connected to the DC power supply, an output coil, and a feedback coil;

a full-wave bridge rectifier connected to the feedback coil of the transformer;

a MOSFET having terminals connected to conduct energy discharged from said feedback coil via said full-wave rectifier in response to a pulse width modulated input control signal applied to a control terminal of the MOSFET;

wherein the stored energy in said feedback coil discharges through said MOSFET in response to switching of the MOSFET by said control signal, thereby reducing energy losses through the MOSFET during flyback and eliminating the need for advance charging during a flyback cycle.

2. An intelligent fast charging circuit for an uninterruptible power system, which comprises:

a transformer having a secondary coil;

a full-wave bridge rectifier connected to the secondary coil;

a switching power regulator connected to an output of the full-wave bridge rectifier for limiting currents output by the rectifier to provide charging protection for the battery;

a switching transistor;

means for causing the switching transistor to switch ON and OFF according to a charge on the battery, and thereby provide intermittent charging to the battery in order to prevent a floating voltage effect during continuous charging; and means including two rectifying diodes, a capacitor, and a plurality of resistors for rectifying and filtering an output of the current limiter and supplying a charging voltage to the battery.

3. An active flyback circuit as claimed in claim 1, further comprising a control transistor also connected to the control input of the MOSFET, wherein when said control transistor is on, said MOSFET is rendered non-conductive regardless of the state of the control signal.

4. A charging circuit as claimed in claim 2, wherein said means for causing the transistor to switch comprises a central processing unit connected between the battery and a base of said transistor.

* * * * *